US008090115B2

(12) United States Patent
Noto

(10) Patent No.: US 8,090,115 B2

(45) Date of Patent: Jan. 3, 2012

(54) TRANSMITTING/RECEIVING SYSTEM, TRANSMITTING DEVICE, AND DEVICE INCLUDING SPEAKER

(75) Inventor: Ryuichiro Noto, Chiba (JP)

(73) Assignee: Sony Corporation, Tokyo (JP)

( * ) Notice: Subject to any disclaimer, the term of this patent is extended or adjusted under 35 U.S.C. 154(b) by 1268 days.

(21) Appl. No.: 11/044,120

(22) Filed: Jan. 26, 2005

(65) Prior Publication Data

US 2005/0190928 A1 Sep. 1, 2005

(30) Foreign Application Priority Data

Jan. 28, 2004 (JP) ................................. 2004-019182

(51) Int. Cl.
*H04B 3/00* (2006.01)

(52) U.S. Cl. ................................ 381/77; 455/518; 381/2

(58) Field of Classification Search .................. 381/1, 2, 381/58, 59, 77, 79, 300, 98, 103, 104; 700/94; 455/418, 420, 41.2, 518, 519; 709/217, 218; 348/14.08, 14.09
See application file for complete search history.

(56) References Cited

U.S. PATENT DOCUMENTS 5,406,634 A * 4/1995 Anderson et al. ............... 381/82
5,710,591 A * 1/1998 Bruno et al. ............... 348/14.09
7,039,197 B1 * 5/2006 Venkatesh et al. .............. 381/86
7,058,419 B2 * 6/2006 Kotzin et al. ................. 455/518
7,302,236 B2 * 11/2007 Shoji et al. ....................... 455/68
2002/0072816 A1 * 6/2002 Shdema et al. ................. 700/94

FOREIGN PATENT DOCUMENTS

| | | |
|---|---|---|
| JP | 58-187099 | 11/1983 |
| JP | 62-049800 | 3/1987 |
| JP | 63-015699 | 1/1988 |
| JP | 06-120903 | 4/1994 |
| JP | 10-174029 | 6/1998 |
| JP | 11-331982 | 11/1999 |
| JP | 2000-287294 | 10/2000 |
| JP | 2001-359200 | * 12/2001 |
| JP | 2002-064900 | 2/2002 |

* cited by examiner

*Primary Examiner* — Xu Mei
*Assistant Examiner* — Lao Lun-See
(74) *Attorney, Agent, or Firm* — Finnegan, Henderson, Farabow, Garrett & Dunner, L.L.P.

(57) ABSTRACT

In a television receiver, based on speaker information of each of one or more devices including speakers which is a memory of the television receiver, a transmitting audio signal to be transmitted to each device including a speaker, in which synchronization is established between devices including speakers in a reproduction mode, is formed and transmitted to the device (including a speaker) through a communication interface. The device (including a speaker) receives the transmitting audio signal addressed thereto through a communication interface, plays back the signal, and uses a speaker of the device to generate sound.

10 Claims, 11 Drawing Sheets

FIG. 6

| SLAVE IDENTIFICATION INFORMATION | FREQUENCY CHARAC-TERISTIC | MAXIMUM VOLUME LEVEL | AUDIO PROCESSING TIME | NUMBER OF SPEAKERS | CHANNEL ASSIGNMENT INFORMATION | | | | |
|---|---|---|---|---|---|---|---|---|---|
| | | | | | 2 ch | 3 ch | 4 ch | 5 ch | 5.1 ch |
| RADIO | — TO — | —— dB | —— msec | 1 | R | R, C | R | R, C | R, C |
| CELLULAR PHONE | — TO — | —— dB | —— msec | 1 | L | L, C | L | L, C | L, C |
| CELLULAR PHONE | — TO — | —— dB | —— msec | 2 | L, R | L, R, C | SR<br>SL | SR<br>SL | SR, Sb<br>SL, Sb |
| ...... | ...... | ...... | ...... | ...... | ...... | ...... | ...... | ...... | ...... |

TRANSMITTING/RECEIVING SYSTEM, TRANSMITTING DEVICE, AND DEVICE INCLUDING SPEAKER

BACKGROUND OF THE INVENTION

1. Field of the Invention

The present invention relates to a transmitting/receiving system for transmitting/receiving an audio signal, and a transmitting device and a device including a speaker, which are used in this transmitting/receiving system.

2. Description of the Related Art

Audio/visual (A/V) systems which have two or more audio channels and which can create a reproduced sound field producing a sense of presence have come into use. For example, in a home theater system or the like that uses a DVD (digital versatile disk) player, audio channels are provided in a form, such as 5.1 channels or 6.1 channels, that is, a so-called "multichannel system (multichannel audio processing system)".

In a 5.1-channel system, six audio channels respectively correspond to a left (L) speaker, a right (R) speaker, and a center (C) speaker which are provided in front of a user, and a surround left (SL) speaker, a surround right (SR) speaker, and a subwoofer which are provided behind the user. In a 6.1-channel system for seven audio channels, an audio channel for a surround center (SC) speaker is added to 5.1 channels. The representation "0.1" in each of the 5.1 channels and 6.1 channels represents a channel for a subwoofer.

In a multichannel system of the above type, when a reproducer or an amplifier is connected to speakers corresponding to channels by using cables, it may take a long time to wire and connect cables, and wired cables may become obstructive.

Accordingly, for example, various types of cordless systems that use infrared radiation and FM (frequency modulation) signals to transmit audio signals from sound sources to speakers have been proposed. These cordless systems include those in which, when sounds must be selectively reproduced only from particular speakers, by diving a carrier frequency by the required number, and establishing correspondence for each divided carrier frequency between particular transmitting and receiving ends, volume, etc., can be separately controlled.

Japanese Unexamined Patent Application Publication No. 06-120903 discloses a technology directed to a cordless system using infrared radiation. In this technology, by controlling an infrared radiation direction and range without using a plurality of carrier frequencies, audio signals are transmitted only to particular speakers. By using the technology in Japanese Unexamined Patent Application Publication No. 06-120903, a circuit configuration of a transmitting unit can be simplified compared with the case of using a plurality of frequencies. This can reduce an increase in cost.

As described above, by using a multichannel system of a cordless type, problems, such as time-consuming cable wiring and connection and obstructive wired cables, can be eliminated, and a reproduced sound field producing a sense of presence can be easily created.

However, in a case in which a multichannel system does not perform multichannel reproduction, for example, when a multichannel system for 5.1 channels reproduces only sounds on two channels (right and left), speakers for four channels, which include a subwoofer, are not used and become useless.

In this case, it is possible that the speakers unused for reproduction be used in a different sound reproducing system. However, in order to use the unused speakers in the different sound reproducing system, the operation of connecting a device that sends an audio signal and the speakers is required. This may trouble the user.

As described above, even if plural speakers dedicated for a multichannel system are installed, there is a possibility that all the plural speakers may not be used, and effective use of the speakers may trouble the user. In addition, even if, in a relatively small room, the user listens to reproduced monaural sound or two-channel stereo sound, there is a need to preferably realize, as easily as possible and with less cost, a reproduced sound field producing a sense of presence as much as possible.

SUMMARY OF THE INVENTION

Accordingly, it is an object of the present invention to provide a system and device for solving the above problems and easily and costlessly realizing a reproduced sound field producing a sense of presence.

According to an aspect of the present invention, a transmitting/receiving system is provided which includes a transmitting device for transmitting an audio signal, and at least one device including a speaker and having a function of operating in stand-alone form. The transmitting device includes: a storage unit for storing speaker information of the at least one device for each of the at least one device; a forming unit for forming, based on the speaker information stored in the storage unit, from an audio signal being subject to processing, a transmitting audio signal to be transmitted to each of the at least one device; and a transmitting unit for transmitting the transmitting audio signal formed by the forming unit to each of the at least one device. Each of the at least one device includes: a receiving unit for receiving the transmitting audio signal transmitted from the transmitting device, the transmitting audio signal being addressed to each of the at least one device; and a generating unit for generating, from the transmitting audio signal received by the receiving unit, an audio signal to be supplied to each speaker included in each of the at least one device.

According to another aspect of the present invention, a transmitting device for transmitting an audio signal to each of at least one device including a speaker is provided. The transmitting device includes a storage unit for storing speaker information of the at least one device for each of the at least one device; a forming unit for forming, based on the speaker information stored in the storage unit, from an audio signal being subject to processing, a transmitting audio signal to be transmitted to each of at least one device; and a transmitting unit for transmitting the transmitting audio signal formed by the forming unit to each of the at least one device.

According to another aspect of the present invention, a device including a speaker and having a function of operating in stand-alone form is provided. The device includes: a receiving unit for receiving a transmitting audio signal transmitted and addressed to the device; and a generating unit for generating, from the transmitting audio signal received by the receiving unit, an audio signal to be supplied to the speaker included in the device.

According to the present invention, in order to construct a multichannel system (multichannel audio processing system), the need to provide dedicated speakers is eliminated.

In addition, when multichannel reproduction is not necessary, devices including speakers can be used in stand-alone form, which is an original form of use.

Moreover, various types of devices can be used as transmitting devices and devices including speakers. Accordingly, a multichannel environment can be formed for enjoyment by the various types of devices.

BRIEF DESCRIPTION OF THE DRAWINGS

FIG. 6 is a table illustrating an example of an external speaker setting table;

DESCRIPTION OF THE PREFERRED EMBODIMENTS

Embodiments of a system and devices of the present invention are described below with reference to the accompanying drawings.

Regarding Overview of Transmitting/Receiving System

Figure 1:
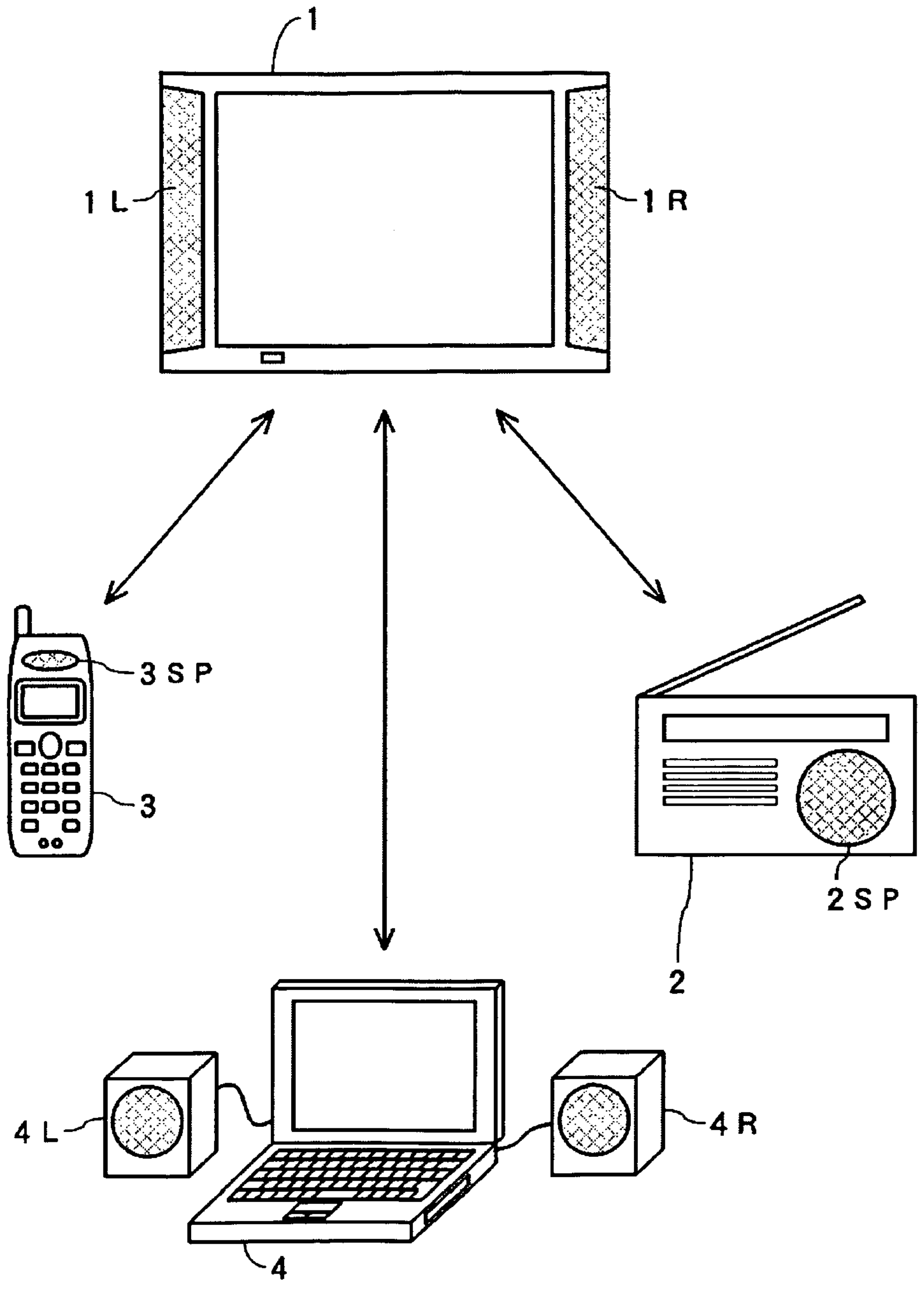
FIG. 1 is an illustration of an overview of a transmitting/receiving system according to an embodiment of the present invention.

FIG. 1 is an illustration of an overview of a transmitting/receiving system according to an embodiment of the present invention. As shown in FIG. 1, the transmitting/receiving system according to this embodiment includes a television receiver 1, a radio receiver 2, a cellular phone terminal 3, and a personal computer 4. An embodiment of a transmitting device of the present invention is applied to the television receiver 1. An embodiment of a device including a speaker is applied to each of the radio receiver 2, the cellular phone terminal 3, and the personal computer 4.

As described later in detail, the television receiver 1 receives a television broadcast signal, plays back video and audio in accordance with a video signal and audio signal provided by the television broadcast signal, and plays back video and audio in accordance with a video signal and audio signal provided by an external device such as a DVD player and a VCR (videocassette recorder). The television receiver 1 can transmit, to an external device including a speaker, an audio signal to be played back.

As shown in FIG. 1, the radio receiver 2 includes a speaker 2SP. The cellular phone terminal 3 includes a speaker 3SP. The personal computer 4 includes two speakers 4L and 4R. As described above, each of the radio receiver 2, the cellular phone terminal 3, and the personal computer 4 is a device including a speaker, and can originally operate as a standalone unit (as an device independent from other devices).

In this embodiment, an audio signal is transmitted from the television receiver 1 to each of the radio receiver 2, the cellular phone terminal 3, and the personal computer 4. sound based on the audio signal from the television receiver 1 is generated by a speaker provided in each of the radio receiver 2, the cellular phone terminal 3, and the personal computer 4. In other words, the television receiver 1, the radio receiver 2, the cellular phone terminal 3, and the personal computer 4 are used to constitute a multichannel system for audio channels.

In this case, as described later in detail, the television receiver 1, which is used as a master device, the radio receiver 2, which is used as a slave device, the cellular phone terminal 3, and the personal computer 4 are connected to one another to enable communication by a communication interface (I/F) in accordance with a predetermined communication standard. Communication interfaces for use include, for example, wireless LAN (local area network) interfaces, such as IEEE 802.11 and 802.11b, and infrared interfaces in accordance with IrDA (Infrared Data Association). In this embodiment, for example, an IEEE 802.11 wireless LAN interface is used.

As described above, in this embodiment, the television receiver 1 can become an audio-signal transmitting master device for each of devices (the radio receiver 2, the cellular phone terminal 3, and the personal computer 4) including speakers, and the device (the radio receiver 2, the cellular phone terminal 3, or the personal computer 4), which receives an audio signal from the master device, can become a slave device.

Distinction between the master device and the slave device can be predetermined. Alternatively, a key operation and switching operation by the user can perform setting of the master device and the slave device.

Regarding Devices Constituting Transmitting/Receiving System

Next, examples of the television receiver 1, the radio receiver 2, the cellular phone terminal 3, and the personal computer 4 which constitute the transmitting/receiving system shown in FIG. 1 are described below.

Regarding Television Receiver 1 (Master Device)

Figure 2:
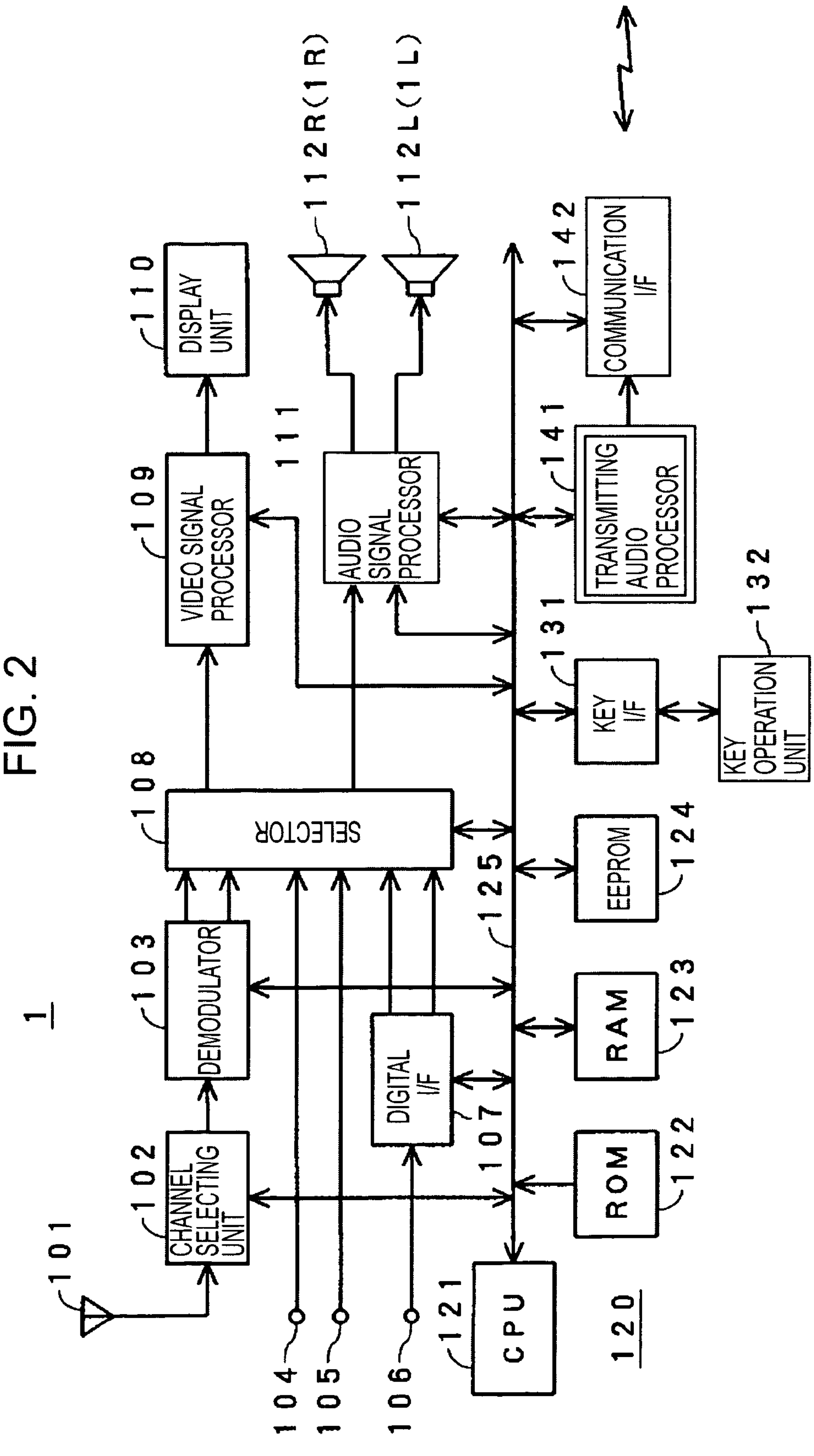
FIG. 2 is a block diagram showing an example of a television receiver in the transmitting/receiving system shown in FIG. 1.

At first, the example of the television receiver 1 is described below. FIG. 2 is a block diagram illustrating the example of the television receiver 1.

As shown in FIG. 2, the television receiver 1 includes a television-broadcast-signal receiving antenna 101, a channel selecting unit 102, a demodulator 103, an analog-video-signal input terminal 104, an analog-audio-signal input terminal 105, a digital input terminal 106, a digital interface (I/F) 107, a selector 108, a video signal processor 109, a display unit 110, an audio signal processor 111, speakers 112L and 112R, a controller 120, a key interface (I/F) 131, a key operation unit 132, a transmitting audio processor 141, and a communication interface (I/F) 142.

The controller 120 controls each block of the television receiver 1. The controller 120 is a microcomputer configured by using a CPU (central processing unit) bus 125 to connect a CPU 121, a read-only memory (ROM) 122, a random access memory (RAM) 123, and an electrically erasable, programmable read-only memory (EEPROM) 124.

In the ROM 122, programs to be executed by the CPU 121 and various types of data required for processing are recorded. The RAM 123 is mainly used as a working area. The EEPROM 124 is a so-called "nonvolatile memory" for storing information that must be stored even if the power of the television receiver 1 is turned off, for example, various setting parameters, etc.

The key operation unit 132 includes various types of operation keys such as a power on/off key, channel selecting keys, a volume adjusting key, a picture quality adjusting key, a master-mode on/off key for causing the television receiver 1 to operate as a master device, a slave-mode on/off key for causing the television receiver 1 to operate as a slave device. The key operation unit 132 can accept an operation input from the user.

The controller 120 acquires the operation input accepted through the key operation unit 132 by using the key interface 131. This allows the controller 120 to control each block in response to the operation input (from the user) accepted through the key operation unit 132.

As described above, the television receiver 1 according to this embodiment includes a television signal input system composed of the receiving antenna 101, the channel selecting unit 102, and the demodulator 103, an analog signal input system composed of the analog-video-signal input terminal 104 and the analog-audio-signal input terminal 105, and a digital signal input system composed of the digital input terminal 106 and the digital interface 107. A type of signal input system from which a signal is to be processed can be selected by the selector 108, which is controlled by the controller 120.

Specifically, by supplying power to the television receiver 1 according to this embodiment, television signals received by the receiving antenna 101 are supplied to the channel selecting unit 102. The channel selecting unit 102 selects a television broadcast signal in accordance with a channel selecting signal from the controller 120, converts the selected signal into an intermediate frequency signal, and supplies the intermediate frequency signal to the demodulator 103. The demodulator 103 separates a video signal and an audio signal from the supplied television signal, demodulates both signals, and supplies the demodulated signals to the selector 108. In addition, as shown in FIG. 1, an analog video signal and analog audio signal (from an external device), supplied from the analog-video-signal input terminal 104 and the analog-audio-signal input terminal 105, are supplied to the selector 108.

A transport stream (TS) signal supplied through the digital input terminal 106 is supplied to the digital interface 107. The TS signal is obtained such that the digital video signal, the digital audio signal, a control signal, etc., are packetized and time-divisionally multiplexed. In this embodiment, the digital interface 107 separates the signals, and supplies the control signal, etc., to the controller 120. The digital interface 107 converts the digital video signal and the digital audio signal into analog signals, and supplies the analog signals to the selector 108.

In response to a switching control signal from the controller 120, the selector 108 performs switching to select one of output of a video signal and audio signal from the demodulator 103, output of a video signal and audio signal input through the analog-video-signal input terminal 104 and the analog-audio-signal input terminal 105, and output of a video signal and audio signal input through the digital input terminal 106 and the digital interface 107.

The video signal output from the selector 108 is supplied to the video signal processor 109. Based on the video signal supplied, the video signal processor 109 forms a display video signal for displaying video on a display screen of the display unit 110, and supplies the display video signal to the display unit 110. The display unit 110 is provided with, for example, a display element such as a plasma display panel (PDP), a liquid crystal display (LCD), or a cathode-ray tube (CRT). The display unit 110 displays, on its display screen, video based on the display video signal.

In addition, the audio signal output from the selector 108 is supplied to the audio signal processor 111. The audio signal output from the selector 108 may be monaural or may has a multichannel form of two or more channels. In this embodiment, based on the audio signal supplied, the audio signal processor 111 forms output audio signals for two (right and left) channels, and supplies the audio signals to the speakers 112R and 112L. This allows the right and left speakers 112R and 112L to generate sounds based on the audio signals processed by the audio signal processor 111.

When the audio signal supplied to the audio signal processor 111 represents channels more than two channels, for example, 5.1 channels, the audio signal processor 111 can output two front (right and left) channels. Alternatively, the audio signal processor 111 can form two (right and left) channel audio signals by combining front right and left audio signals and a center speaker audio signal. Alternatively, the audio signal processor 111 can form two (right and left) channel audio signals by considering all the audio signals on 5.1 channels. The speakers 112R and 112L shown in FIG. 2 correspond to the speakers 1R and 1L shown in FIG. 1, respectively.

As described above, the television receiver 1 according to this embodiment can play back video and audio based on a television broadcast signal, which is received and selected, video and audio based on an analog video signal and analog audio signal from a VCR or the like, and video and audio based on a digital TS signal from a DVD player.

When the television receiver 1 is set to the master mode by operating a predetermined key of the key operation unit 132, by controlling the transmitting audio processor 141, based on, for example, an external speaker setting table formed in the EEPROM 124, the controller 120 forms a transmitting audio signal to be transmitted to each device including a speaker, which is external slave device.

In other words, the transmitting audio processor 141 is supplied with the audio signal from the selector 108. Based on the audio signal from the selector 108, in response to information of the external speaker setting table formed in the EEPROM 124, the transmitting audio processor 141 forms a transmitting audio signal to be transmitted to each of external devices including speakers.

The transmitting audio signal is formed so that, when sound is reproduced based on the information of the external speaker setting table by using the speakers of the radio receiver 2, the cellular phone terminal 3, and the personal computer 4, which are external devices including speakers, reproduction timing of each reproduced sound does not differ (so that synchronization of reproduced sound is established). Specifically, by setting each device (including a speaker) to have a processing delay time, the reproduction synchronization can be established. In this embodiment, the transmitting audio signal is, for example, packetized digital data including slave identification information representing a destination, and includes control information such as delay time information of slave devices.

In this embodiment, the external speaker setting information table formed in the EEPROM 124 is stored information of speaker characteristics, etc., of each slave device, as described later. In this embodiment, information set in the external speaker setting table is obtained by using the communication interface 142 to receive information transmitted from each slave device and using the controller 120 to set the received information in the EEPROM 124.

The communication interface 142 in this embodiment is an IEEE 802.11 wireless LAN interface. The communication interface 142 can convert information to be transmitted therefrom into a signal having a form matching the interface, and can transmit this signal to a different device, which is a destination. The communication interface 142 can also perform receiving a signal addressed to the television receiver 1, converting the received signal into a signal having a form that can be processed therein, and supplying the converted signal to the controller 120.

The transmitting audio signal formed by the transmitting audio processor 141 is supplied to the communication interface 142. In this case, based on the transmitting audio signal from the transmitting audio processor 141, the communication interface 142 forms an audio signal which complies with the standard and which is to be actually transmitted, and transmits the audio signal to each slave device.

The functions of the transmitting audio processor 141 can be realized by a program (software) executed by the CPU 121 in the controller 120.

As described above, the television receiver 1 according to this embodiment can play back video and audio based on a received television broadcast signal and on a video signal and audio signal from each external device including a speaker. In addition, when being set to the master mode, the television receiver 1 can form a transmitting audio signal to be transmitted to slave devices including speakers, which are positioned around the television receiver 1, and can transmit the transmitting audio signal to each slave device.

Regarding Radio Receiver 2 (Slave Device)

Figure 3:
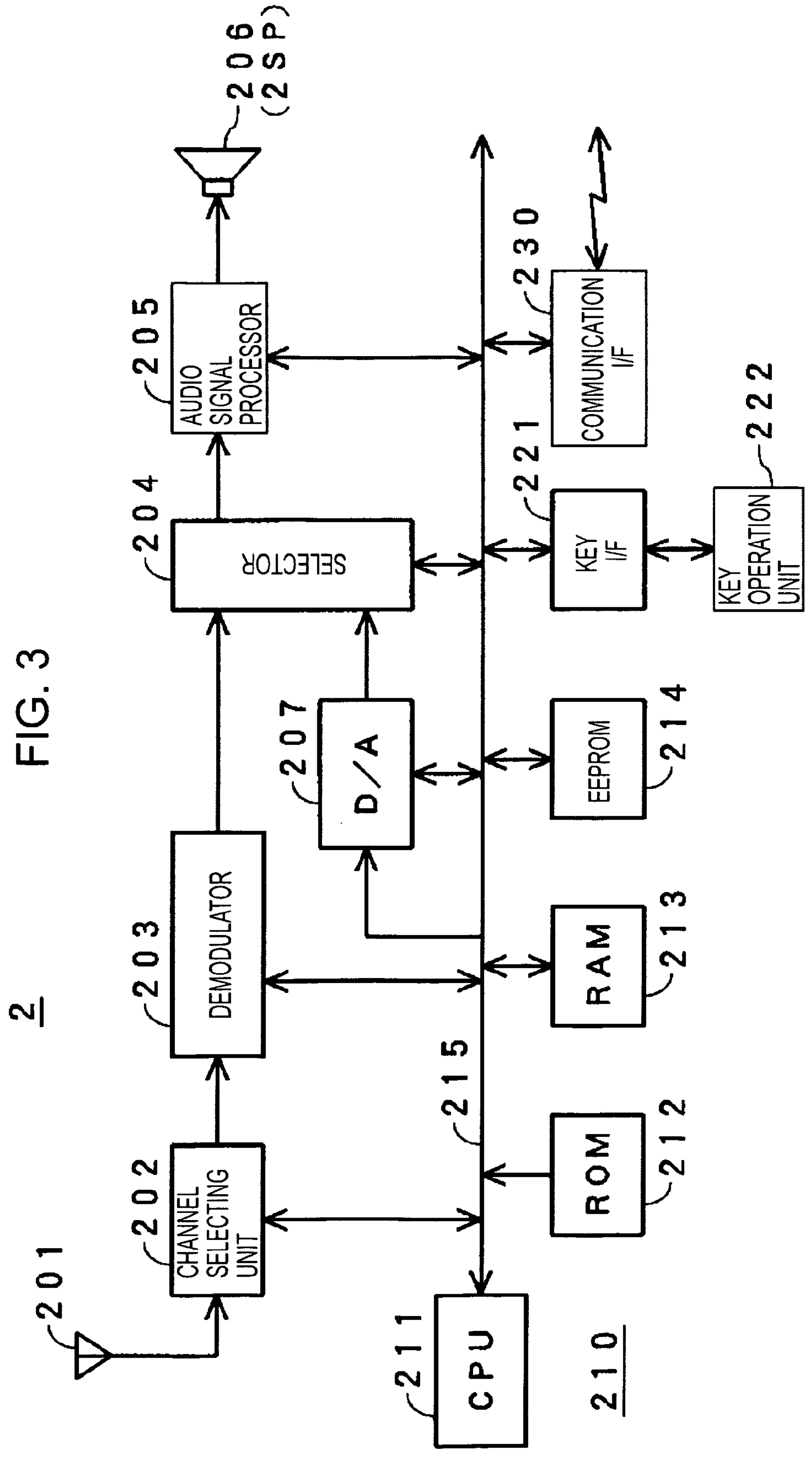
FIG. 3 is a block diagram showing an example of a radio receiver in the transmitting/receiving system shown in FIG. 1.

Next, an example of the radio receiver 2, which is used as a slave device, is described below. FIG. 3 is a block diagram illustrating the example of the radio receiver 2 in the transmitting/receiving system shown in FIG. 1.

As shown in FIG. 3, in this embodiment, the radio receiver 2 includes a television-broadcast-signal receiving antenna 201, a channel selecting unit 202, a demodulator 203, a selector 204, an audio signal processor 205, a speaker 206, a digital-to-analog (D/A) converter 207, a controller 210, a key interface (I/F) 221, a key operation unit 222, and a communication interface (I/F) 230.

The controller 210 controls each block of the radio receiver 2, and is a microcomputer configured by using a CPU bus 215 to connect a CPU 211, a ROM 212, a RAM 213, and an EEPROM 214.

In the ROM 212, programs to be executed by the CPU 211 and the various types of data required for processing are recorded. The RAM 213 is mainly used as a working area. The EEPROM 214 is a so-called "nonvolatile memory" for storing information that must be stored even if the power of the radio receiver 2 is turned off, for example, various setting parameters, etc.

The key operation unit 222 includes various types of operation keys, such as a power on/off key, channel selecting keys, a volume adjusting key, and a slave-mode on/off key for causing the radio receiver 2 to operate as a slave device, and can accept an operation input from the user.

The controller 210 acquires the operation input (from the user) through the key operation unit 222 by using the key interface 221. This allows the controller 210 to control each block in response to the operation input (from the user) accepted through the key operation unit 222.

The communication interface 230 is an IEEE 802.11 wireless LAN interface similarly to the communication interface 142 (in the television receiver 1) described with reference to FIG. 2. The communication interface 230 can convert information to be transmitted from the radio receiver 2 into a signal having a form matching the interface, and can transmit this signal to a different device, which is a destination. The communication interface 230 can also perform receiving a signal addressed to the radio receiver 2, converting the received signal into a signal having a form that can be processed therein, and supplying the converted signal to the controller 210.

The D/A converter 207 converts a digital audio signal supplied through the controller 210 into an analog audio signal, and supplies the audio signal to the selector 204.

Radio broadcast signals received by the receiving antenna 201 are supplied to the channel selecting unit 202. Based on a channel selecting signal from the controller 210, the channel selecting unit 202 selects and converts a targeted radio broadcast signal into an intermediate frequency signal, and supplies the intermediate frequency signal to the demodulator 203. After demodulating the supplied intermediate frequency signal, the demodulator 203 supplies the demodulated audio signal to the selector 204.

The selector 204 is supplied with also an audio signal from the D/A converter 207. In other words, the digital audio signal accepted through the communication interface 230 is supplied to the D/A converter 207 through the controller 210. After converting the supplied digital audio signal into an analog audio signal, the D/A converter 207 supplies the analog audio signal to the selector 204.

In response to a switching control signal from the controller 210, the selector 204 switches between output of an audio signal from the demodulator 203 and output of an audio signal from the D/A converter 207. In this embodiment, the controller 210 in the radio receiver 2 controls the selector 204 to output the audio signal from the demodulator 203 when the slave mode is off, and to output the audio signal from the D/A converter 207 when the slave mode is on.

An audio signal output from the selector 204 is supplied to the audio signal processor 205. Under the control of the controller 210, the audio signal processor 205 forms an audio signal in which a volume and tone are adjusted, and supplies the audio signal to the speaker 206. This allows the speaker 206 to generate sound based on the audio signal from the audio signal processor 205.

In this embodiment, when the radio receiver 2 is set to the slave mode, as described above, the signal is accepted through the communication interface 230 and is supplied to the speaker 206 through the controller 210, the D/A converter 207, the selector 204, and the audio signal processor 205. Thus, the speaker 206 can function as an external speaker for the television receiver 1, which is used as a master device.

The ROM 212 or EEPROM 214 in the radio receiver 2 stores information concerning characteristics of the speaker 206 of the radio receiver 2. In response to a request from the master device, the information can be transmitted to the master device through the communication interface 230. In addition, the speaker 206 corresponds to the speaker 2SP of the radio receiver 2 shown in FIG. 1.

Regarding Cellular Phone Terminal 3 (Slave Device)

Figure 4:
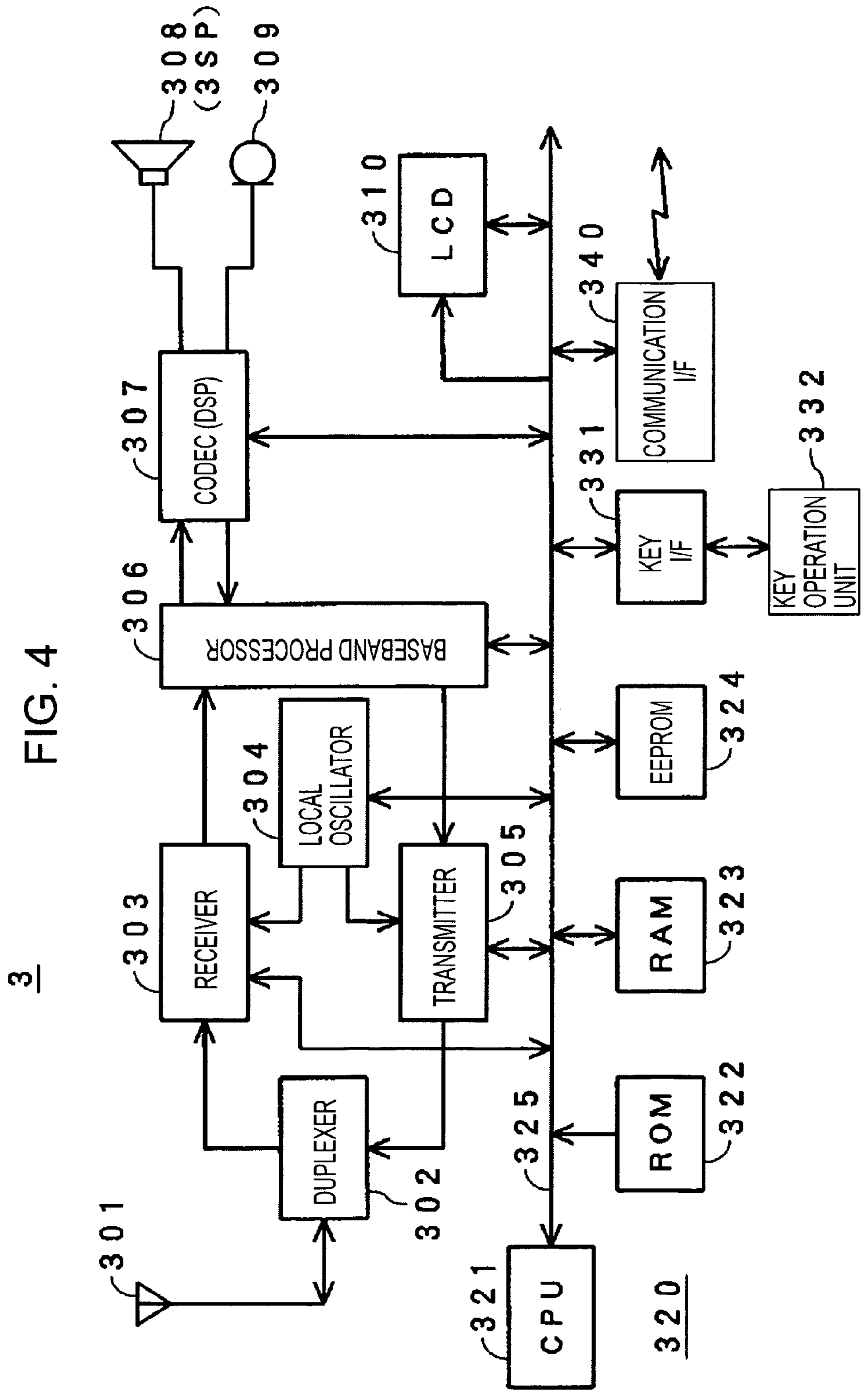
FIG. 4 is a block diagram showing an example of a cellular phone terminal in the transmitting/receiving system shown in FIG. 1.

Next, an example of the cellular phone terminal 3, which is used as a slave device in the transmitting/receiving system (in FIG. 1) according to this embodiment, is described below. FIG. 4 is a block diagram illustrating the example of the cellular phone terminal 3 in the transmitting/receiving system according to this embodiment.

As shown in FIG. 4, in this embodiment, the cellular phone terminal 3 includes a transmitting/receiving antenna 301, an antenna duplexer 302, a receiver 303, a local oscillator 304, a transmitter 305, a baseband processor 306, a codec 307, an ear receiver (speaker) 308, a phone transmitter (microphone) 309, an LCD 310, a controller 320, a key interface 331, a key operation unit 332, and a communication interface 340.

The controller 320 controls each block of the cellular phone terminal 3, and is a microcomputer configured by using a CPU bus 325 to connect a CPU 321, a ROM 322, a RAM 323, and an EEPROM 324.

In the ROM 322, programs to be executed by the CPU 321 and the various types of data required for processing are recorded. The RAM 323 is used as a working area. The EEPROM 324 is a so-called "nonvolatile memory" for storing information that must be stored even if the power of the cellular phone terminal 3 is turned off, for example, various setting parameters, telephone directory data, etc.

The key operation unit 332 includes various types of operation keys such as a power on/off key, an off-hook/on-hook key, a ten-key pad, various function keys, and a slave-mode on/off key for causing the cellular phone terminal 3 to operate as a slave device. The key operation unit 332 can accept an operation input from the user.

The controller 320 acquires the operation input (from the user) accepted through the key operation unit 332 by using the key interface 331. This allows the controller 320 to control each block in response to the operation input (from the user) accepted through the key operation unit 332.

The communication interface 330 is an IEEE 802.11 wireless LAN interface similarly to the communication interface 142 (in the television receiver 1) shown in FIG. 2 and the communication interface 230 (in the radio receiver 2) shown in FIG. 3. The communication interface 330 can convert information to be transmitted from the cellular phone terminal 3 into a signal having a form matching the interface, and can transmit this signal to a different device, which is a destination. The communication interface 330 can also perform receiving a signal addressed to the cellular phone terminal 3, converting the received signal into a signal having a form that can be processed therein, and supplying the converted signal to the controller 320.

The cellular phone terminal 3 is described with it divided into a receiving system and a transmitting system. At first, the receiving system is described. A signal received by the transmitting/receiving antenna 301 is supplied to the receiver 303 through the duplexer 302. The receiver 303 performs necessary band limiting and automatic gain control (AGC) so that the received signal has an appropriate level. In addition, after performing processing based on a signal from the local oscillator 304 (frequency synthesizer), such as controlling the frequency of the received signal to be constant, the receiver 303 supplies the processed signal to the baseband processor 306.

The baseband processor 306 converts the signal from the receiver 303 from analog into digital form, and performs elimination of adverse effects such as fading, identifying the received signal, de-interleaving, and error correction. After performing appropriate demodulation, the baseband processor 306 separates audio data and communication data other than the audio data. The audio data is supplied to the codec 307, which is formed by a digital signal processor (DSP), while the communication data, such as various types of control information and character data, is supplied to the controller 320.

The codec 307 forms an analog audio signal by performing digital-to-analog conversion on the audio data from the baseband processor 306, and supplies the analog audio signal to the speaker 308. The speaker 308 is driven by the analog audio signal from the codec 307 to output sound based on the received signal. The speaker 308 corresponds to the speaker 3SP (of the cellular phone terminal 3) shown in FIG. 1.

In addition, when the communication data supplied from the baseband processor 306 to the controller 320 is control data for the cellular phone terminal 3 or character data, the supplied data is temporarily stored in the RAM 323 in the controller 320 and is used in the cellular phone terminal 3. The communication data of other types is supplied to an external electronic device (external device), such as a personal computer connected to the cellular phone terminal 3, through an external interface (not shown).

Next, in this embodiment, the transmitting system of the cellular phone terminal 3 is described below.

The microphone 309 converts collected sound into an analog audio signal and supplies the analog audio signal to the codec 307. The codec 307 converts the analog audio signal from the microphone 309 into a digital audio signal, and supplies the digital audio signal to the baseband processor 306.

The baseband processor 306 uses a predetermined encoding method to encode and compress the digital audio signal from the codec 307 into predetermined blocks. The baseband processor 306 also forms predetermined blocks from digital data supplied to the cellular phone terminal 3 through an external input/output terminal and external interface (not shown). The baseband processor 306 collectively supplies the transmitter 305 with the compressed digital audio signal and digital data from the external device.

The transmitter 305 forms a modulated signal based on the digital data from the baseband processor 306. In order to convert the modulated signal into a predetermined transmission frequency, the transmitter 305 forms a transmitting modulated signal by mixing the modulated signal and a converting signal from the local oscillator 304. The transmitting modulated signal formed in the transmitter 305 is transmitted from the transmitting/receiving antenna 301 through the duplexer 302.

In the cellular phone terminal 3 in this embodiment which includes the above transmitting and receiving systems, in a standby mode, the controller 320 detects a reception state of the cellular phone terminal 3 by monitoring a reception signal from the baseband processor 306. When detecting the reception state, the controller 320 reports the reception state to a user of the cellular phone terminal 3 by controlling a ringer (not shown) to generate a beep (ringer sound).

When the user of the cellular phone terminal 3 responds to an incoming call by performing an off-hook operation such as pressing the off-hook key of the key operation unit 332, the controller 320 establishes a communication link by sending a connection response through the transmitting system, whereby, as described above, the receiving and transmitting systems operate to enable a conversation.

In addition, when the cellular phone terminal 3 in this embodiment sends a call request, after performing an off-hook operation such as pressing the off-hook key of the key operation unit 332, by using dial keys of the key operation unit 332 or selecting a destination telephone number from a telephone number list registered beforehand, a dialing operation can be performed.

This allows the controller 320 to generate and send a call request through the transmitting system, whereby a communication link can be established between the cellular phone terminal 3 and a targeted telephone terminal. After a response is received from the destination, by confirming the establishment of the communication link, the receiving and transmitting systems operate to enable a conversation, as described above.

The cellular phone terminal 3 in this embodiment can connect to the Internet. For example, the cellular phone terminal 3 can transmit and receive e-mail by using a provider function provided by a telephone company. Also, by inputting and transmitting a uniform resource locator (URL), the cellular phone terminal 3 can perform acquiring information of a web page, etc., displaying the information on the LCD 310, and outputting the information to external devices through an external interface and an input/output terminal.

Also in the cellular phone terminal 3, when the slave mode is set by using the key operation unit 332, the controller 320 can input the digital audio signal acquired through the communication interface 340 to the reproduction system of the codec 307. The codec 307 decodes the audio signal from the controller 320 into analog audio signal, and supplies the analog audio signal to the speaker 308.

As described above, by setting the cellular phone terminal 3 in this embodiment to be in the slave mode, the cellular phone terminal 3 can function as an external speaker for the television receiver 1, which is a master device.

Even if the cellular phone terminal 3 in this embodiment is in the slave mode, it is on standby for receiving an incoming call. Accordingly, when receiving the call, the cellular phone terminal 3 reports reception of the call by generating ring alert. In addition, when the off-hook operation is performed, the slave mode is turned off to enable the cellular phone terminal 3 to be used as a cellular phone terminal as usual.

The ROM 322 or EEPROM 324 in the cellular phone terminal 3 in this embodiment stores information concerning characteristics, etc., of the speaker 308 of the cellular phone terminal 3. In response to a request from the master device, the cellular phone terminal 3 can transmit the information to the master device through the communication interface 340.

Regarding Personal Computer 4 (Slave Device)

Figure 5:
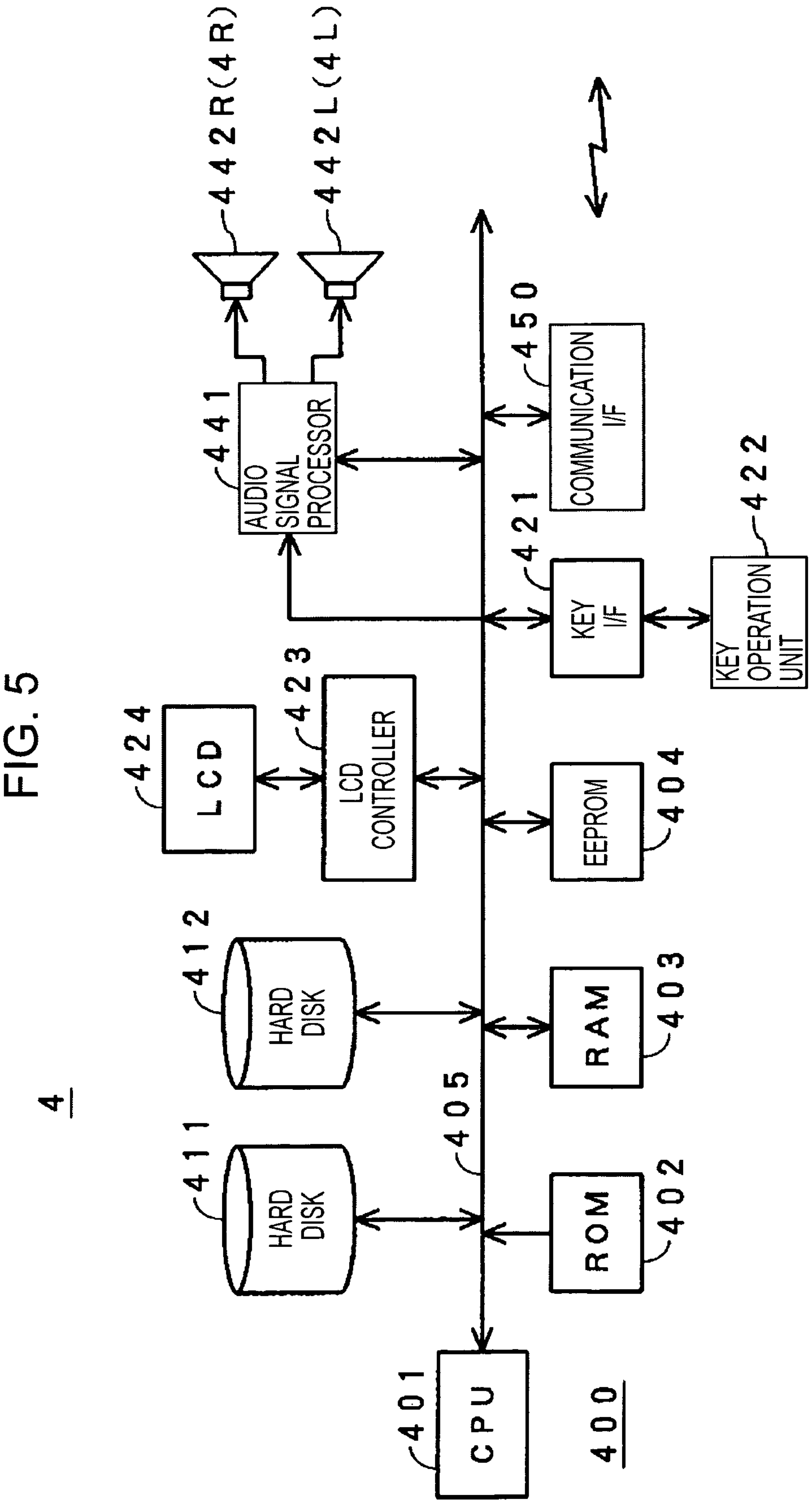
FIG. 5 is a block diagram showing an example of a personal computer in the transmitting/receiving system shown in FIG. 1.

Next, an example of the personal computer 4, which is used as one of the slave devices in the transmitting/receiving system (in FIG. 1) according to this embodiment, is described below. FIG. 5 is a block diagram illustrating the example of the personal computer 4 in the transmitting/receiving system according to this embodiment.

The personal computer 4 in this embodiment is, for example, a notebook personal computer. As shown in FIG. 5, the personal computer 4 includes a controller 400 configured by using a CPU bus 405 to connect a CPU 401, a ROM 402, a RAM 403, and an EEPROM 404. As shown in FIG. 5, the controller 400 connects to hard disk drives 411 and 412 serving as mass storage recording media.

The controller 400 connects to a key operation unit 422 serving as an interface with the user, with a key interface 421 provided therebetween. The controller 400 also connects to an LCD 424 through an LCD controller 423, and connects to two channel (right and left) speakers 442R and 442L through an audio signal processor 441. A communication interface 450 is also connected to the controller 400. The speakers 442R and 442L correspond to the speakers 4R and 4L shown in FIG. 1, respectively.

The controller 400 controls each block of the personal computer 4. In the ROM 402, programs to be executed by the CPU 401 and the various types of data required for processing are recorded. The RAM 403 is mainly used as a working area. The EEPROM 404 is a so-called "nonvolatile memory" for storing information that must be stored even if the power of the personal computer 4 is turned off, for example, various setting parameters, etc.

The key operation unit 422 includes various operation keys such as alphabet keys, a ten-key pad, various function keys, a slave-mode on/off key for causing the personal computer 4 to operate as a slave device, and a master-mode on/off key for causing the personal computer 4 to operate as a master device. The key operation unit 422 can accept an operation input from the user.

The controller 400 can acquire the operation input (from the user) accepted through the key operation unit 422 through the key interface 421. This allows the controller 400 to control each block in response to the operation input (from the user) accepted through the key operation unit 422.

The communication interface 450 is an IEEE 802.11 wireless LAN interface similarly to the communication interface 142 (in the television receiver 1) shown in FIG. 2, the communication interface 230 (in the radio receiver 2) shown in FIG. 3, and the communication interface 340 shown in FIG. 4. The communication interface 450 can convert information to be transmitted from the personal computer 4 into a signal having a form matching the interface, and can transmit this signal to a different device, which is a destination. The communication interface 450 can also perform receiving a signal addressed thereto, converting the received signal into a signal having a form that can be processed therein, and supplying the converted signal to the controller to the controller 400.

In the personal computer 4 in this embodiment, the CPU 401 in the controller 400 reads and executes a program stored in the ROM 402 or programs stored in the hard disk drives 411 and 412, whereby the information accepted through the key operation unit 422 can be recorded on the hard disk drives 411 or 412, and data supplied from an external device through the communication interface 450 can be recorded on the hard disk 411 or 412.

In this embodiment, based on various types of data, the personal computer 4 can perform calculation to obtain the result of the calculation. Also, by playing back the video signal recorded on the hard disk drive 411 or 412, the personal computer 4 can display, on the LCD 424, video based on the played-back video signal. In addition, by playing back an audio signal, the personal computer 4 can use the speakers 442R and 442L to generate sound based on the audio signal. In other words, the personal computer 4 can perform various types of information processing.

As described above, in this embodiment, in the personal computer 4, the key operation unit 422, the LCD 424, and the speakers 442R and 442L are used as an interface with the user. These enable acceptance of information, information processing, provision of processed information, etc.

Also, when the personal computer 4 in this embodiment is in the slave mode, as described above, the personal computer 4 accepts information through the communication interface 450 and supplies the information to the 442R and 442L through the audio signal processor 441. Thus, the personal computer 4 can function as an external speaker for the television receiver 1 (master device).

In the personal computer 4 in this embodiment, the ROM 402 or the EEPROM 404 stores information concerning characteristics, etc., of the 442R and 442L of the personal computer 4. In response to a request from the master device, the information can be transmitted to the master device through the communication interface 450.

The television receiver 1, radio receiver 2, cellular phone terminal 3, and personal computer 4 described with reference to FIGS. 2 to 5 constitute, as shown in FIG. 1, a transmitting/receiving system to which the present invention is applied and which uses the television receiver 1 as a master device and the other devices as slave devices. The television receiver 1 forms transmitting audio signals for the radio receiver 2, the cellular phone terminal 3, and the personal computer 4, and transmits each audio signal to each slave device.

Regarding External Speaker Setting Table Formed in Master Device

FIG. 6 is an illustration of an example of an external speaker setting table for forming audio signals to be transmitted to the slave devices. In this embodiment, as described above, the external speaker setting table shown in FIG. 6 is formed by the controller 120 in the television receiver 1 based on information from each slave device in response to a request from the television receiver 1 (master device), and is stored in the EEPROM 124.

As shown in FIG. 6, the external speaker setting table in this embodiment contains slave identification information, frequency characteristic information of speakers provided in slave devices identified by the slave identification information, maximum volume levels, audio processing times, the numbers of speakers, and channel assignment information.

The slave identification information is used to identify each slave device and is unique to the slave device. For example, information, such as a serial number assigned beforehand by a manufacturer, and setting identification information set by a user for each slave information, or a combination of a serial number and a setting identification number set by a user can be used as the slave identification information. The frequency characteristics are characteristics of speakers provided in the slave devices. In this embodiment, the frequency characteristics represent frequency bands.

The maximum volume levels represent the maximum levels of volumes that can be output by the speakers provided in the slave devices. The audio processing times each represent the time required for outputting, from a speaker, sound based on an audio signal after receiving the audio signal. The numbers of speakers each represent the number of speakers provided in each slave device.

These pieces of information, that is, the slave identification information, the frequency characteristic, the maximum volume level, the audio processing time, and the number of speakers, are provided by each slave device in response to a request from the television receiver 1 (master device).

In addition, as shown in FIG. 6, the channel assignment information is used to set information representing audio signal channels assigned to each slave device. The channel assignment information corresponds to a position in which each slave device is disposed. The channel assignment information can be set by using, for example, the key operation unit 132 of the television receiver 1 (master device).

In this embodiment, as shown in FIG. 1, the radio receiver 2 is disposed to the right side of the television receiver 1, the cellular phone terminal 3 is disposed to the left side of the television receiver 1, and the personal computer 4 is disposed in front of the television receiver 1. In response to the above disposition of the devices and the number of channels of audio signals to be processed, the user can input the channel assignment information.

Specifically, in the case of the external speaker setting table shown in FIG. 6, when the television receiver 1 processes two (right and left) channel audio signals, audio channels are assigned so that the right channel (R) audio signal is supplied to the radio receiver 2, the left channel (L) audio signal is supplied to the cellular phone terminal 3, and the right (R) and left channel (L) audio signals are supplied to the personal computer 4.

When the television receiver 1 processes three channel audio signals composed of a left channel (L) signal, a right channel (R) signal, and a center channel (C), audio channels are assigned so that the right channel (R) and center channel (C) audio signals are supplied to the radio receiver 2, the left channel (L) and center channel (C) audio signals are supplied to the cellular phone terminal 3, and the left channel (L), center channel (C), and right channel (R) audio signals are supplied to the personal computer 4.

When the television receiver 1 processes four channel audio signals composed of a left channel (L) signal, a right channel (R) signal, a surround left channel (SL) signal, and a surround right channel (SR) signal, audio signals are assigned so that the right channel (R) audio signal is supplied to the radio receiver 2, the left channel (L) audio signal is supplied to the cellular phone terminal 3, and the surround left channel (SL) audio signal and the surround right channel (SR) audio signal are supplied to the personal computer 4.

When the television receiver 1 processes five channel audio signals, audio channels are assigned so that the right channel (R) and center channel (C) audio signals are supplied to the radio receiver 2, the left channel (L) and center channel (C) audio signals are supplied to the cellular phone terminal 3, and the surround left channel (SL) and surround right channel (SR) audio signals are supplied to the personal computer 4.

When the television receiver 1 processes 5.1-channel audio signals, audio channels are assigned so that right channel (R) and center channel (C) audio signals are supplied to the radio receiver 2, left channel (L) and center channel (C) audio signals are supplied to the cellular phone terminal 3, and surround left channel (SL), surround right channel (SR), and subwoofer channel (Sb) audio signals are supplied to the personal computer 4.

Based on the external speaker setting table shown in FIG. 6, the transmitting audio processor 141 in the television receiver 1 forms a transmitting audio signal to be provided to each slave device, and transmits the audio signal through the communication interface 142.

For example, when the television receiver 1 processes 5.1-channel audio signals from a DVD player (not shown) connected to the television receiver 1, by referring to information in the external speaker setting table shown in FIG. 6, the transmitting audio processor 141 supplies the radio receiver 2 with the sum of right channel (R) and center channel (C) audio signals, and supplies the cellular phone terminal 3 with the sum of left channel (L) and center channel (C) audio signals.

For the personal computer 4, the personal computer 4 generates a surround left channel (SL) audio signal, which is the sum of surround left channel (SL) and subwoofer channel (Sb) audio signals, and a surround right channel (SR) audio signal, which is the sum of a surround right channel (SR) and the subwoofer channel (Sb) audio signals. The transmitting audio processor 141 transmits the generated audio signals to the personal computer 4.

Obviously, audio signals to be transmitted to each slave device are processed so that, based on information in the external speaker setting table shown in FIG. 6, the frequency band and volume level of audio signals whose number corresponds to the number of speakers are limited (adjusted), and delay time information considering an audio processing time of each slave device is added to the audio signals (to be transmitted) so that, in a reproduction mode, reproduction can be performed while establishing synchronization between slave devices.

When each slave device, that is, each of the radio receiver 2, the cellular phone terminal 3, and the personal computer 4, receives audio signals addressed to the slave device, as described above, by using the audio signal processor of the slave device to perform reproduction and supplying the reproduction signal to the speaker of the slave device, sound based on the audio signals from the television receiver 1 is generated and the slave device can function as an external speaker for the television receiver 1.

Regarding Operations of Master Device and Slave Device

Next, the operations of the master device and each slave device in the above transmitting/receiving system are described below.

Formation of External Speaker Setting Table

Figure 7:
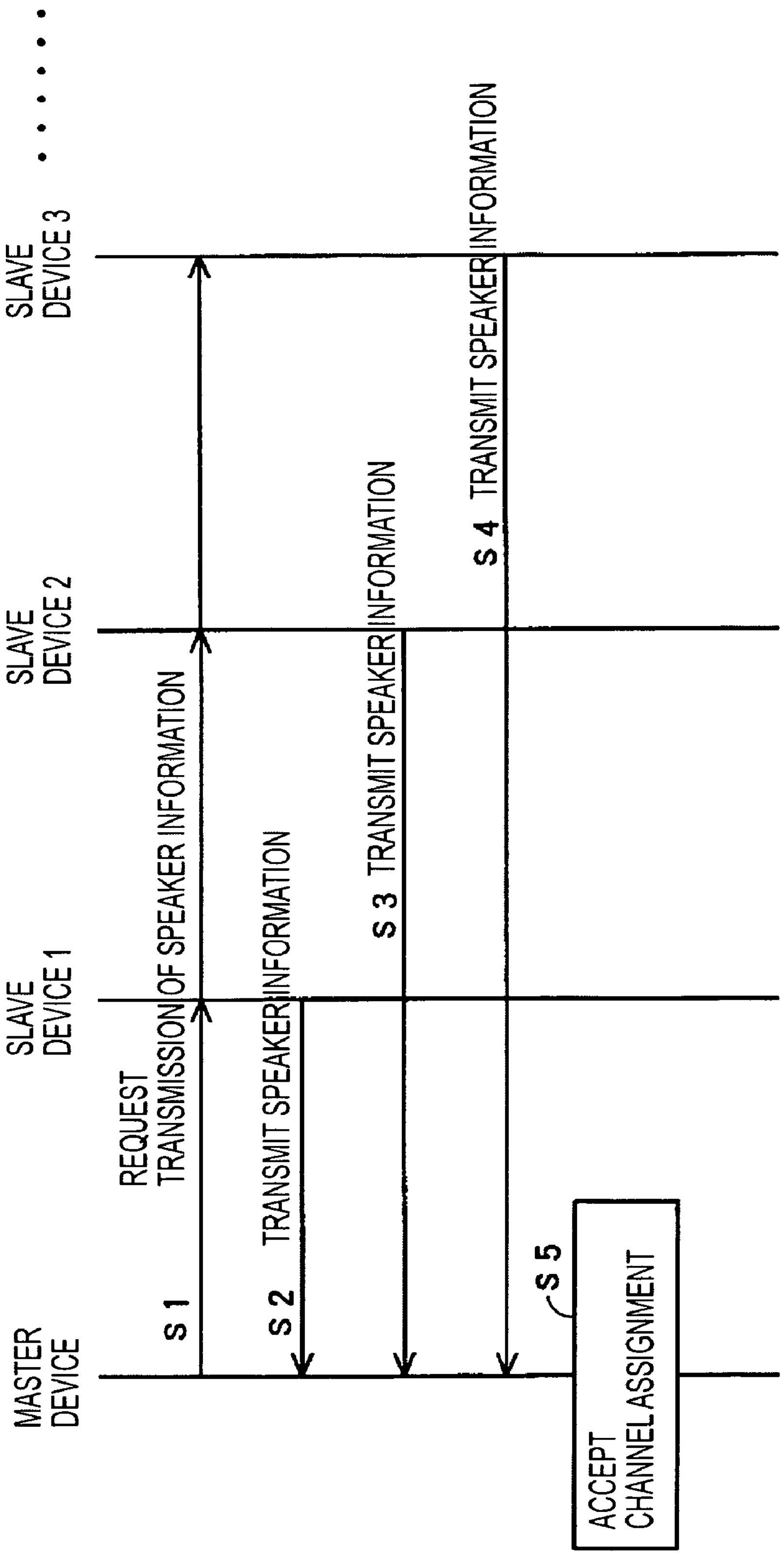
FIG. 7 is a timing chart illustrating transmission and reception of speaker information between a master device and each of slave devices.

At first, the operations of the master device and each slave device in the case of forming the external speaker setting table are described with reference to the timing chart shown in FIG. 7. FIG. 7 is a timing chart illustrating transmission and reception of speaker information between the master device and each slave device.

As described above, by performing a predetermined operation on a predetermined electronic device for processing an audio signal, that is, the television receiver 1 in this embodiment, the television receiver 1 is set to the master mode. In this embodiment, by performing a predetermined operation on each of the radio receiver 2, the cellular phone terminal 3, and the personal computer 4, each of the radio receiver 2, the cellular phone terminal 3, and the, 4 is set to the slave mode.

The mode setting enables the television receiver 1 to function as a master device and to supply audio signals to slave devices. By receiving the audio signals supplied, each of the radio receiver 2, the cellular phone terminal 3, and the personal computer 4 uses its speaker to generate sound based on the received audio signals. However, unless the external speaker setting table for the television receiver 1 as the master device is not in the latest state, appropriate audio signals cannot be formed and supplied to each slave device.

Accordingly, by inputting an instruction to the television receiver 1 through the key operation unit 132 for forming or not forming the external speaker setting table, the controller 120 in the television receiver 1 generates a request for transmission of speaker information that requests each slave device to supply speaker information, and transmits the request to the slave device through the communication interface 142 (step S1). The request for transmission of speaker information can be transmitted to the slave devices in broadcast form, and can be separately transmitted to each slave device.

When receiving the request for transmission of speaker information through the communication interface 230, the controller 210 in the radio receiver 2, which is a slave device, generates speaker information including information of the radio receiver 2 which is stored in the ROM 212 or the EEPROM 214, and the speaker of the radio receiver 2, and sends the speaker information back to the television receiver 1 (master device) through the communication interface 230.

When receiving the request for transmission of speaker information through the communication interface 340, as described above, the controller 320 in the cellular phone terminal 3, which is a slave device, generates speaker information including information of the cellular phone terminal 3 which is stored in the ROM 322 or the EEPROM 324 and the speaker of the cellular phone terminal 3, and sends the speaker information back to the television receiver 1 (master device), through the communication interface 340 (step S3).

Similarly, when receiving the request for transmission of speaker information through the communication interface 450, as described above, the controller 400 in the personal computer 4, which is a slave device, generates information of the personal computer 4 which is stored in the ROM 402 or the EEPROM 404, and sends the information back to the television receiver 1 through the communication interface 450 (step S4).

As described above, after receiving the speaker information transmitted from each slave device, the controller 120 in the television receiver 1 uses the received speaker information to form an external speaker setting table as shown in FIG. 6 (step S5). This enables the television receiver 1 to form and supply appropriate audio signals to each slave device.

Regarding Operations of Master Device and Slave Device

Figure 8:
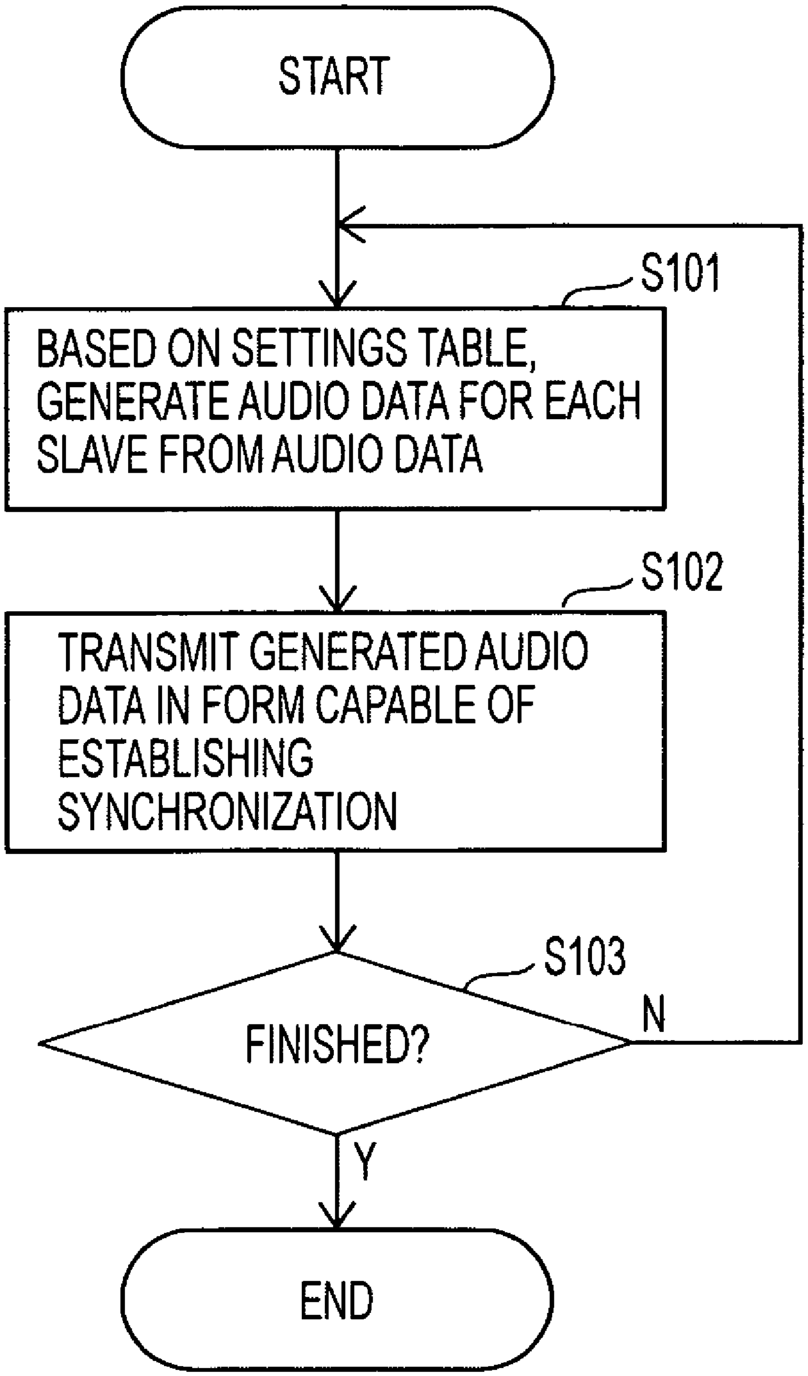
FIG. 8 is a flowchart illustrating a transmitting process of the master device.

FIG. 8 is a flowchart illustrating an audio signal playback process of the television receiver 1 (master device). When the television receiver 1 plays back the received television broadcast signal, or video and audio from an external device, the controller 120 in the television receiver 1 executes the process shown in FIG. 8. Specifically, the controller 120 controls the transmitting audio processor 141 to refer to the external speaker setting table formed in the EEPROM 124 of the controller 120, and generates transmitting audio signals (transmitting audio data) to be supplied to each slave device by considering the number of channels of audio signals to be processed by the television receiver 1 (step S101).

The controller 120 uses the communication interface 142 to transmit the transmitting audio signals (transmitting audio data) (to be transmitted) generated in the transmitting audio processor 141 (step S102). The controller 120 determines whether it has finished processing on the audio signals to be processed (step S103). If the controller 120 has determined that it has not finished the processing, step S101 and thereafter are repeatedly performed. Alternatively, if, in step S103, the controller 120 has determined that it has finished the processing on the audio signals to be processed, the process shown in FIG. 8 ends.

FIG. 8 illustrates a process in which the television receiver 1 supplies the audio signals to the slave device. In parallel with the process shown in FIG. 8, in the television receiver 1, the video signal processor 109 and the audio signal processor 111 function to play back video and audio.

Figure 9:
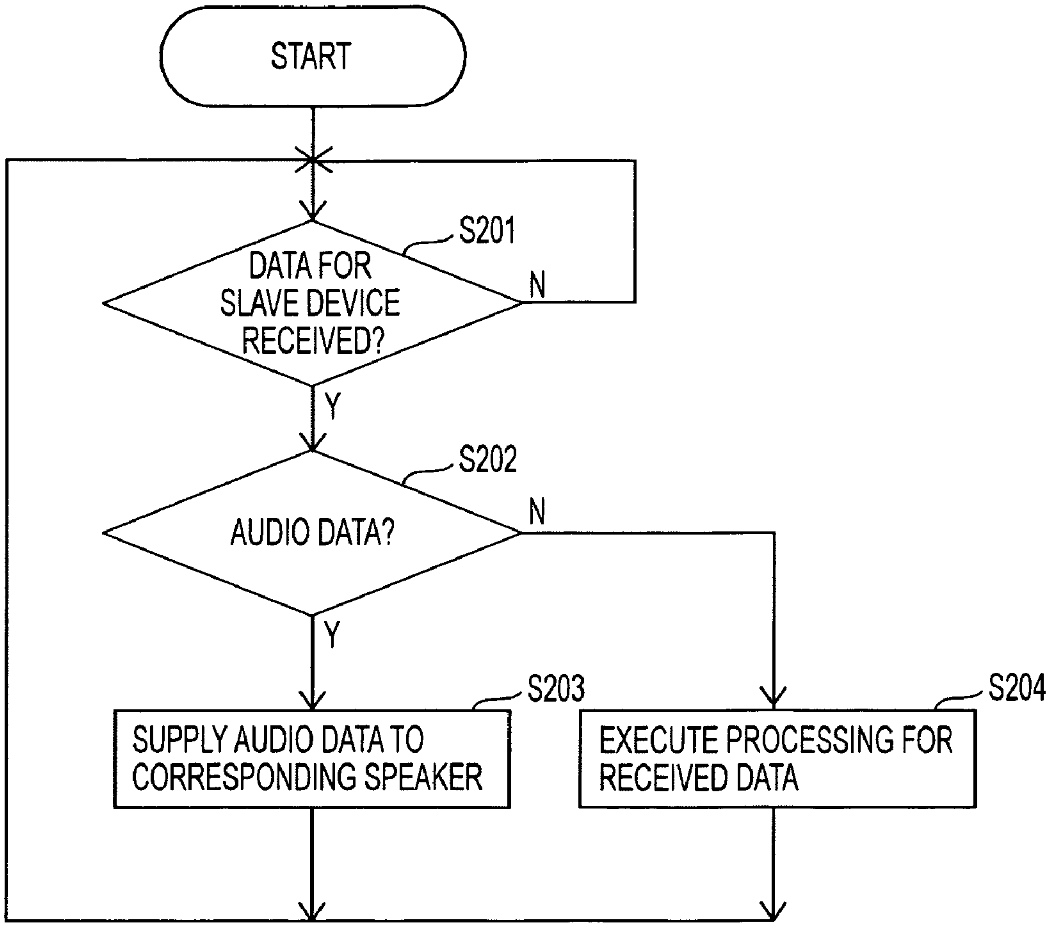
FIG. 9 is a flowchart illustrating a receiving process of the slave device.

FIG. 9 is a flowchart illustrating a slave mode process of each of the radio receiver 2, the cellular phone terminal 3, and the personal computer 4, which are in the slave mode. When each of radio receiver 2, the cellular phone terminal 3, and the personal computer 4 is set to the slave mode, the process shown in FIG. 9 is executed. For brevity of description, the process shown in FIG. 9 is described as a process of the radio receiver 2, which is a slave device.

When the radio receiver 2 is set to the slave mode, the controller 210 executes the process shown in FIG. 9. The controller 210 is on standby for receiving data (data for the radio receiver 2) addressed to the radio receiver 2 through the communication interface 230 (step S201). If, in step S201, the controller 210 has determined that it has received the data addressed to the radio receiver 2, it determines whether the received data is audio data.

If, in step S202, the controller 210 has determined that the received data is audio data, it supplies the audio data to the audio signal processor 205 through the D/A converter 207 and the selector 204, and supplies the audio data to the speaker 206 through the audio signal processor 205. This allows the speaker 206 to generate sound based on the transmitting audio signals addressed (from the television) receiver 1 to the radio receiver 2.

If, in step S202, the controller 210 has determined that the received data is not audio data, it performs processing matching the received data. For example, if the received data is a request for transmission of speaker information, the controller 210 performs processing matching the received data, such as generating and transmitting speaker information to the master device (step S204). After that, step S201 and thereafter are repeatedly performed.

As described above, in the transmitting/receiving system according to this embodiment, the television receiver 1 (master device), and the radio receiver 2, the cellular phone terminal 3, and the personal computer 4, which are used as slave devices, can be connected by communication interfaces based on the same standard. The television receiver 1 (master device) forms audio signals that match each speaker of each device (used as a slave device) including a speaker, and transmits the signals through the communication interface, whereby sound based on the audio signals can be generated by the speaker of each slave device.

This enables the master device to use speakers of devices including speakers, which are disposed around the master device, as its speakers, to easily construct a multichannel speaker system, even if a plurality of speakers dedicated for the master device are not provided.

In other words, by implementing, in both the master device (multichannel reproduction device) and each slave device (device including a speaker), software for executing a network connecting function and the processes shown in FIGS. 7, 8, and 9, a multichannel speaker system (surround system) can be easily and inexpensively constructed.

Regarding Other Examples

In the transmitting/receiving system described with reference to FIG. 1, the television receiver 1 itself, which is the master device, includes speakers, and uses also speakers of slave devices disposed around the master device, as speakers of the television receiver 1, whereby a multichannel speaker system can be easily constructed. However, the master device does not always include the speakers.

Figure 10:
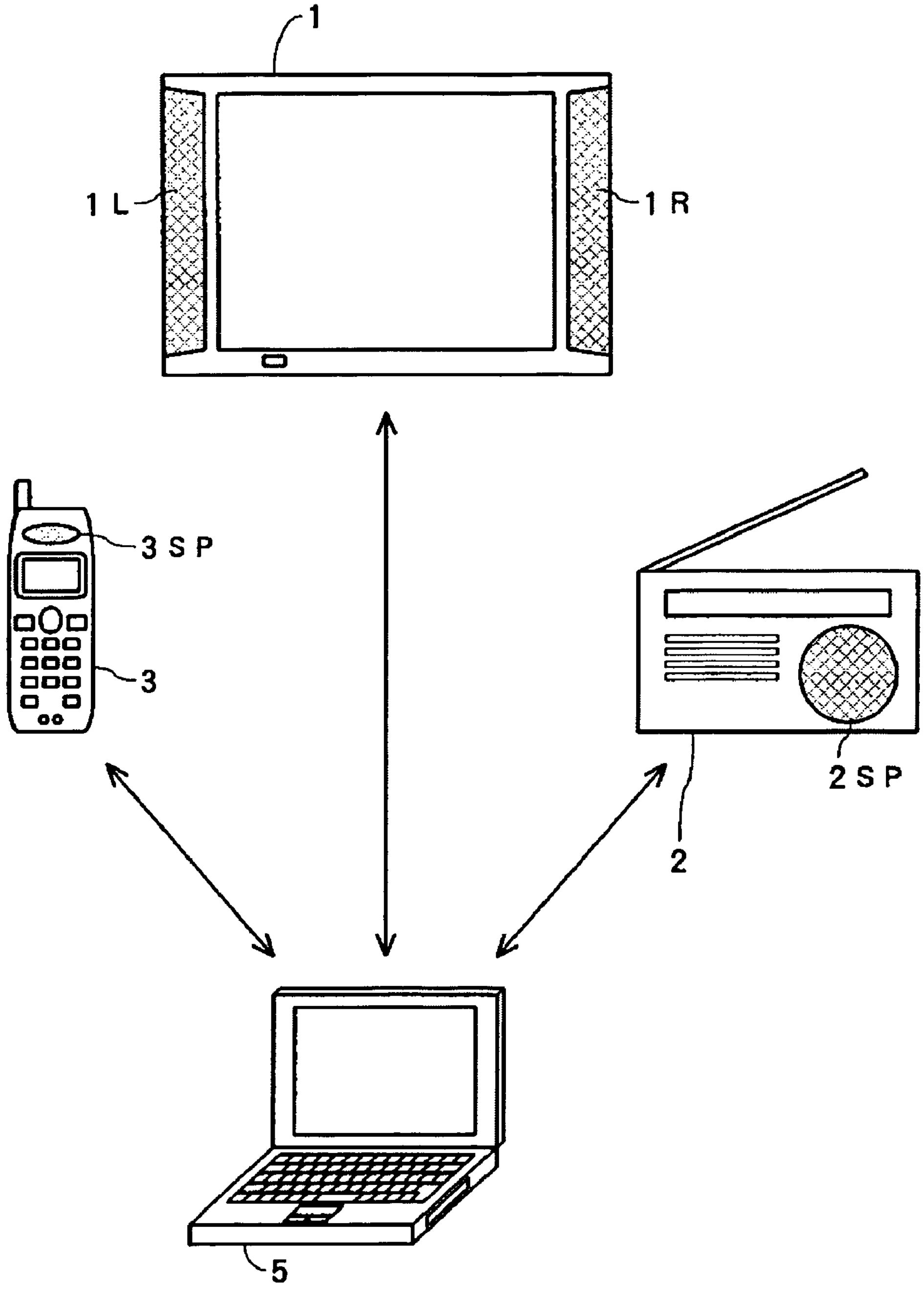
FIG. 10 is an illustration of another example of a transmitting/receiving system to which the present invention is applied.

For example, as shown in FIG. 10, a personal computer 5 including no speaker is used as a master device, and the television receiver 1 can be used as a slave device by switching to the slave mode. The television receiver 1, the radio receiver 2, and the cellular phone terminal 3 are identical in configuration to those described with reference to FIGS. 2, 3, and 4.

The personal computer 5 is such that, in the personal computer 4 shown in FIG. 5, at least the speakers 422R and 422L are not provided, or the audio signal processor 441 and the speakers 422R and 422L are not provided. Regarding other points, the personal computer 5 is identical in configuration to the personal computer 4 shown in FIG. 5.

In the case of the transmitting/receiving system shown in FIG. 10, the personal computer 5 is used as a master device, and the television receiver 1, the radio receiver 2, and the cellular phone terminal 3 are used as slave devices. By performing processing for forming the external speaker setting table shown in FIG. 7 between the master device and each slave device, the external speaker setting table is formed in the EEPROM 404 in the personal computer 5 as the master device.

In addition, by executing the process shown in FIG. 8 in the controller 400 in the personal computer 5, and executing the process shown in FIG. 9 in each of the controllers 120, 210, and 320 in the television receiver 1, the radio receiver 2, and the cellular phone terminal 3, external speakers can be provided for an electronic device capable of processing audio signals although it includes no speaker. Therefore, even for a device including no speaker, a surround system can be easily constructed.

Figure 11:
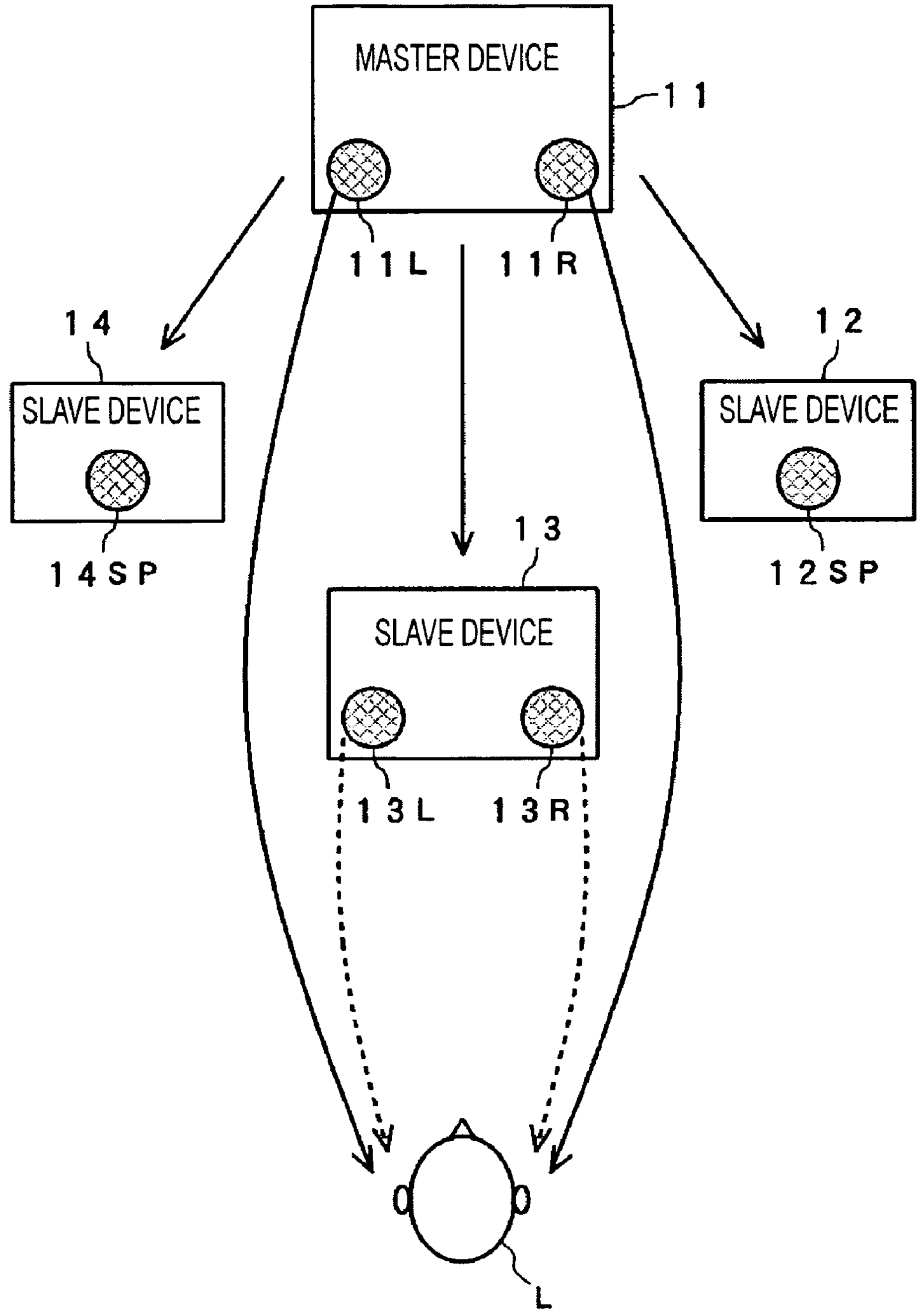
FIG. 11 is an illustration of another example of a transmitting/receiving system to which the present invention is applied.

The disposition of the slave devices is not limited a form in which the slave devices are disposed around a listener who is the user. For example, as FIG. 11 shows, a master device 11 and slave devices 12, 13, and 14 may be all disposed in front of the listener. In this case, when the master device 11 and the slave device 13 process audio signals on the same channels to generate sound, there is a possibility that it is difficult to listen to the generated sound since a phase difference occurs between sounds from speakers of both devices.

In this case, adjustment may be performed so that the phase difference between sounds from the speakers of both devices, such as, in the master device 11, shortening the time required for processing audio signals supplied to the speakers of the master device 11, in the slave device 13, delaying the time required for processing audio signals supplied to the speakers of the slave device 13, or performing both techniques.

Specifically, by enabling the audio processing time (delay time) of the external speaker setting table formed in an EEPROM of the master device or the like to be adjusted, a phase difference of sound generated by speakers of each device can be adjusted. An adjustable unit can be set to, for example, a predetermined unit such as a 1-millisecond unit and 0.1-millisecond unit.

Regarding Other Points

In the above description, mode setting is performed such that the user uses a key operation unit or the like of each electronic device in such as a manner that, in the transmitting/receiving system according to the above embodiment, among electronic devices constituting the transmitting/receiving system, an electronic device to be used as a master device is set to the master mode and electronic devices to be used as slave devices are set to the slave mode. However, the mode setting is not limited thereto.

For example, a mode switching operation may be performed so that only the electronic device to be used as a master device is set to the master mode. A controller of the electronic device set to the master mode generates a request for switching to set the slave mode in an electronic device that can perform transmitting and receiving data through a communication interface based on the same standard. The request is transmitted through the communication interface.

After receiving the request for switching to the slave mode, the electronic device checks its operating status. When the checking indicates that the mode can be switched to the slave mode, the electronic device switches its mode to the slave mode, and generates and transmits, to the master device, response information including identification information of the electronic device, information indicating that the mode has been switched to the slave mode, and speaker information of the electronic device.

After receiving the response information, the master device can form an external speaker setting table in its memory, or can update the external speaker setting table by comparing information in the external speaker setting table and the received response information. This establishes a connection environment for transmitting/receiving system, and the master device uses speakers of external devices as its speakers to construct a multichannel speaker system.

As described above, in response to a request from the electronic device set to the master mode, devices including speakers, which are disposed around the master device, can be automatically switched to the slave mode.

When, in the memory of the electronic device set to the master mode, an external speaker setting table already has been formed, by generating and transmitting, only to electronic devices whose information is set in the external speaker setting table, a request for switching to the slave mode, a response from a targeted device including a speaker may be received.

In addition, when, in the electronic device set to the master mode, the master mode is cancelled, and when the power is turned off, by transmitting a slave mode canceling request from the electronic device to each device set to the slave mode, the slave mode can be cancelled.

When the electronic device, which receives a request for switching to the slave mode, is in use (in operation as a stand-alone device), the request for switching to the slave mode may be ignored. Alternatively, each electronic device, having the slave mode, can variously respond to the above case, such as a technique that assigns priority levels to possible operating statuses, and switches to the slave mode when the device is in a low priority level operating status.

In the above described embodiment, the television receiver 1, the radio receiver 2, the cellular phone terminal 3, and the personal computer 4 constitute the transmitting/receiving system. Those constituting the transmitting/receiving system are not limited to the above devices.

Not only the television receiver 1 and the personal computer 4, but also various types of devices capable of processing audio signals and outputting the processed signals, such as a radio receiver, a radio cassette recorder, a stereo component system, a cellular phone terminal, a telephone terminal, and playback devices and recording/playback devices using various types of recording media such as a compact disc (CD), a MiniDisc (MD), a digital versatile disk (DVD), and a semiconductor memory, can be used as master devices.

Any devices including speakers, such as a television receiver, a personal computer, a radio receiver, a radio cassette recorder, a stereo component system, a cellular phone terminal, and a telephone terminal, can be used.

In addition, obviously, an electronic device which has the master mode and the slave mode and which is usable both as a master device and as a slave device can be formed. Also, obviously, an electronic device which can be set to the master mode and which is usable only as a master device, and an electronic device which can be set to the slave mode and which is usable only as a slave device can be formed.

As the communication interface for use in transmitting audio signals, various types of interfaces capable of signal transmission and reception, such as radio waves, infrared radiation, radio, Ethernet®, and an IEEE (Institute of Electrical and Electronic Engineers) 1394 digital interface, can be used regardless of distinction between wired and wireless forms.

When the master device is provided with plural different communication interfaces, it may perform data transmission and reception and transmitting audio data to a targeted slave device through the different communication interfaces.

For example, when, in the transmitting/receiving system shown in FIG. 1, the television receiver 1 as the master device has a function of connecting to the Internet and a function of using a telephone line to connect to the Internet, transmission and reception of requests, setting information, and audio data may be performed for the cellular phone terminal 3 and the personal computer 4 by using the telephone line or using the Internet.

When, in the transmitting/receiving system shown in FIG. 1, for example, a transmission module using an AM (amplitude modulation) signal or FM (frequency modulation) signal can be connected to the television receiver 1, audio signals may be transmitted to the radio receiver 2 as the slave device by using an AM signal or FM signal.

In addition, in the transmitting/receiving system shown in FIG. 1, networks for transmitting audio data can be set to differ in such a manner that an AM or FM signal is used to transmit to the radio receiver 2, a telephone line is used to transmit an audio signal to the cellular phone terminal 3, and a wireless LAN is used to transmit audio data to the personal computer 4. In this case, for each communication interface, a transmitting audio processor that forms transmitting audio signals need to be provided.

In the above described embodiment, a case in which all devices constituting a transmitting/receiving system are of different types is exemplified. However, the devices are not limited to the case. Obviously, plural devices of the same type, such as a plurality of radio receivers, a plurality of cellular phone terminals, and a plurality of personal computers, can be used as slave devices.

In addition, by using one cellular phone terminal as a master device, and using other cellular phone terminals as slave devices, a new form in which electronic devices including speakers are used is realized, such as a manner in which, when plural friends gather, by using their cellular phone terminals to easily construct a multichannel speaker system, they can enjoy music.

Also, a signal that is subject to processing by a master device is not limited to a multichannel signal, but it may be a monaural audio signal. In other words, obviously, based on the monaural audio signal, an audio signal to be transmitted to each slave device can be formed.

What is claimed is:

1. A system comprising:

a first device, the first device comprising:

a speaker of the first device, a unit configured to switch the first device from an audio source master mode to an audio recipient slave mode, a storage unit configured to store speaker information of a second device, a unit configured to form, based on a multichannel audio source signal and on the speaker information stored in the storage unit, an audio signal to be transmitted to the second device when the first device is in the audio source master mode and the second device is in the audio recipient slave mode, wherein at least one channel of the multichannel audio signal is one of a right audio channel, a left audio channel, a center audio channel, a surround left audio channel, a surround right audio channel, or a subwoofer audio channel, a transmitter configured to transmit the formed audio signal to the second device when the first device is in the audio source master mode, wherein the transmitted audio signal includes control information of the second device, a receiver configured to receive an audio signal transmitted from the second device when the first device is in the audio recipient slave mode and the second device is in the audio source master mode, and a reproduction unit configured to reproduce the audio signal transmitted from the second device or using the speaker of the first device when the first device is in the audio recipient slave mode and for reproducing at least one channel of the multichannel audio signal when the first device is in the audio source master mode; and the second device, the second device comprising:

a speaker of the second device, a receiver configured to receive the audio signal transmitted from the first device, and a reproduction unit configured to reproduce the audio signal from the first device, based on the control information included in the audio signal, using the speaker of the second device when the second device is in the audio recipient slave mode and to reproduce an audio signal of the second device, the audio signal of the second device being different from the audio signal transmitted from the first device, using the speaker of the second device when the second device is in either a stand-alone mode or the audio source master mode.

2. The system according to claim 1, wherein the first device further comprises:

an accepting unit configured to accept an input for setting the speaker information; and a recording unit configured to record, in the storage unit, the accepted speaker information.

3. The system according to claim 1, wherein:

the first device further comprises:

a receiver configured to receive the speaker information from the second device; and a recording unit configured to record, in the storage unit, the received speaker information; and the second device further comprises:

a storage unit configured to store speaker information of the first device.

4. The system according to claim 1, wherein the speaker information stored in the storage unit includes at least one of a speaker frequency characteristic, a maximum volume level, the time required for output after receiving the audio signal, the number of speakers, and positional information of the second device.

5. The system according to claim 3, wherein the first device further comprises an accepting unit configured to accept, as a piece of the speaker information stored in the storage unit, an input for setting positional information of the second device.

6. A first device for transmitting an audio signal to a second device that includes a speaker of the second device, the first device comprising:

a speaker of the first device;

a switching unit configured to switch from an audio source master mode to an audio recipient slave mode;

a storage unit configured to store speaker information of the second device;

a unit configured to form, based on a multichannel audio source signal and on the speaker information stored in the storage unit, an audio signal to be transmitted to the second device when the first device is in the audio source master mode, wherein at least one channel of the multichannel audio signal is one of a right audio channel, a left audio channel, a center audio channel, a surround left audio channel, a surround right audio channel, or a subwoofer audio channel;

a transmitter configured to transmit the formed audio signal to the second device when the first device is in the audio source master mode, wherein the transmitted audio signal includes control information of the second device used by the second device to reproduce the transmitted audio signal;

a receiver configured to receive an audio signal transmitted from the second device when the first device is in the audio recipient slave mode; and a reproduction unit configured to reproduce the audio signal transmitted from the second device using the speaker of the first device when the first device is in the audio recipient slave mode and to reproduce at least one channel of the multichannel audio signal when the first device is in the audio source master mode.

7. The first device according to claim 6, further comprising:

an accepting unit configure to accept an input for setting the speaker information; and a recording unit configured to record, in the storage unit, the accepted speaker information.

8. The first device according to claim 6, further comprising:

a receiver configured to receive the speaker information from the second device; and a recording unit configured to record, in said storage unit, the received speaker information.

9. The first device according to claim 6, wherein the speaker information stored in the storage unit includes at least one of a speaker frequency characteristic, a maximum volume level, the time required for output after receiving the audio signal, the number of speakers, and positional information of the second device.

10. The first device according to claim 8, further comprising:

an accepting unit configured to accept, as a piece of the speaker information stored in the storage unit, an input for setting positional information of the second device.

* * * * *